United States Patent
Gopalakrishnan et al.

(10) Patent No.: US 6,928,404 B1
(45) Date of Patent: Aug. 9, 2005

(54) SYSTEM AND METHODS FOR ACOUSTIC AND LANGUAGE MODELING FOR AUTOMATIC SPEECH RECOGNITION WITH LARGE VOCABULARIES

(75) Inventors: Ponani Gopalakrishnan, Yorktown Heights, NY (US); Dimitri Kanevsky, Ossining, NY (US); Michael Daniel Monkowski, New Windsor, NY (US); Jan Sedivy, Prague (CZ)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/271,469

(22) Filed: Mar. 17, 1999

(51) Int. Cl.⁷ .......................... G06F 17/21; G06F 17/28
(52) U.S. Cl. ............................... 704/10; 704/1; 704/7; 704/9; 704/231; 704/251; 704/253; 704/255; 707/101
(58) Field of Search ............................... 704/1, 4, 7, 9, 704/10, 231, 251

(56) References Cited

U.S. PATENT DOCUMENTS

| | | | | |
|---|---|---|---|---|
| 5,229,936 A | * | 7/1993 | Decker et al. ............... 704/10 |
| 5,323,316 A | * | 6/1994 | Kadashevich et al. ......... 704/9 |
| 5,369,577 A | * | 11/1994 | Kadashevich et al. ......... 704/9 |
| 5,377,281 A | * | 12/1994 | Ballard et al. ............. 382/229 |
| 5,467,425 A | * | 11/1995 | Lau et al. ................... 704/243 |
| 5,708,829 A | * | 1/1998 | Kadashevich et al. ....... 715/531 |
| 5,835,888 A | * | 11/1998 | Kanevsky et al. ............. 704/9 |
| 5,835,893 A | * | 11/1998 | Ushioda .................... 704/257 |
| 5,930,754 A | * | 7/1999 | Karaali et al. ............... 704/259 |
| 5,953,541 A | * | 9/1999 | King et al. .................. 710/67 |
| 6,038,527 A | * | 3/2000 | Renz ........................... 704/9 |
| 6,070,133 A | * | 5/2000 | Brewster et al. ............... 704/9 |
| 6,073,091 A | * | 6/2000 | Kanevsky et al. ............. 704/9 |
| 6,101,492 A | * | 8/2000 | Jacquemin et al. ........... 707/3 |
| 6,278,968 B1 | * | 8/2001 | Franz et al. ................. 704/3 |
| 6,285,980 B1 | * | 9/2001 | Gandhi et al. ............. 704/256 |
| 6,308,149 B1 | * | 10/2001 | Gaussier et al. ............... 704/9 |
| 6,308,156 B1 | * | 10/2001 | Barry et al. ................ 704/268 |
| 6,334,132 B1 | * | 12/2001 | Weeks ....................... 707/101 |
| 6,338,057 B1 | * | 1/2002 | Weeks ......................... 707/3 |

* cited by examiner

Primary Examiner—Richemond Dorvil
Assistant Examiner—Lamont Spooner
(74) Attorney, Agent, or Firm—Frank V. DeRosa

(57) ABSTRACT

Systems and methods are provided for generating a language component vocabulary VC for a speech recognition system having a language vocabulary V of a plurality of word forms. One method for generating a language component vocabulary VC for a speech recognition system having a language vocabulary V of a plurality of word forms includes partitioning the language vocabulary V into subsets of word forms based on frequencies of occurrence of the respective word forms, in at least one the subsets, splitting word forms having frequencies less than a threshold to thereby generate word form components and generating a language component vocabulary VC including word forms and word form components. The resulting language component vocabulary, which includes word forms and word components, is used to generate a language model that can be efficiently implemented for real-time automatic speech recognition applications for languages with large vocabularies.

7 Claims, 7 Drawing Sheets

SYSTEM AND METHODS FOR ACOUSTIC AND LANGUAGE MODELING FOR AUTOMATIC SPEECH RECOGNITION WITH LARGE VOCABULARIES

BACKGROUND

1. Technical Field

The present application generally relates to automatic speech recognition and, in particular, to system and methods for generating acoustic and language models for large vocabularies.

2. Description of the Related Art

In general, automatic speech recognition systems ("ASR") operate with two kinds of vocabularies: an acoustic vocabulary and a language vocabulary. In a language vocabulary (or word vocabulary), words are represented with an ordinary textual alphabet. In an acoustic vocabulary, the spoken sounds of words are represented by an alphabet consisting of a set of phonemes. The words that comprise the acoustic vocabulary are referred to as baseforms. These baseforms can be generated either manually (which is typically done for relatively small vocabularies) or by utilizing spelling-to-sound mapping techniques (which are used for languages having well defined pronunciation rules such as the Russian language).

The vocabulary size of many languages is small enough such that conventional statistical language modeling methods (e.g., trigram models) may be efficiently utilized in real-time decoding speech recognition applications. For instance, more than 99% of the English language which is typically written and spoken may be represented by a relatively small language,vocabulary (e.g., 35 k words) and acoustic vocabulary (e.g., 100 k words). Indeed, n-gram modeling of words (e.g., n=3) has been successfully utilized in recent years in speech recognition systems for vocabularies having up to 64,000 words (which generally require a training corpus of a few hundred million words).

On the other hand, word-based language models such as n-grams are inadequate for inflected languages having relatively much larger vocabularies (e.g., several hundred thousand words or more). For example, the Russian language requires at least 400,000 word forms to represent more than 99% of the everyday spoken Russian language, and a vocabulary of several million words is needed to completely cover all of the possible word forms in the Russian language.

There are several problems associated with utilizing a word-based language model for a large vocabulary in a real-time ASR system. For example, with conventional n-gram modeling, a large vocabulary cannot be directly utilized as a basic 1-gram component in the n-gram language model due to the excessive time associated with accessing such data during decoding. Moreover, an extremely large corpus of data would be required to train the n-gram language models. Furthermore, a database of every word comprising such a large vocabulary is generally not available (e.g., for performing training) and is difficult to construct.

These problems are compounded by the fact that an acoustic vocabulary is significantly larger than the corresponding language vocabulary since there can be several basic pronunciations of one word that give rise to multiple baseforms per word. Consequently, a large acoustic vocabulary significantly increase the acoustic processing time due to the large number of candidate baseforms which have to be verified before the ASR system can choose one or several baseforms which match a spoken utterance.

Furthermore, a large vocabulary may also be encountered with speech that relates to one or more technical fields consisting of unique, specialized language (which are hereinafter referred to as out-of-vocabulary ("OOV") words). For example, medical and law vocabularies must be utilized if real-time ASR decoding is to be performed in a court room during a medical malpractice trial. Accordingly, when faced with inflected or specialized languages, efficient and accurate real-time decoding requires decreasing the vocabulary size and processing time of the OOV words.

There is a need, therefore, for a method for generating a language model which allows a large, basic language vocabulary to be compressed to a manageable size such that the language can be efficiently modeled for real-time ASR applications. One such method for generating Slavic language models is disclosed in U.S. patent application Ser. No. 08/662,726 entitled "Statistical Language Model For Inflected Languages" by Kanevsky et al., which is commonly assigned to the present assignee and incorporated herein by reference. With this method, words in a training corpus are split into stems and endings (i.e., word components) and n-gram (e.g., trigrams) statistics are generated for stems only, endings only and stems and endings in their natural order, as well as statistical distributions of stems/endings. The resulting language model is based on the vocabulary of components and is a weighted sum of the different language models that are generated for each of these components. By using the components (e.g., stems and endings) as the working vocabulary (as opposed to using the vocabulary consisting of the "non-split" words), the size of the vocabulary may be reduced by an order of magnitude as compared to the vocabulary of (non-split) words. Consequently, a language model that is based on word components is more compact than a standard n-gram language model that is based on the whole (non-split) word-form vocabulary.

Nevertheless, the language model discussed above (which is derived from word components) requires consideration of six consecutive components (stem-ending-stem-ending-stem-ending) in order to fetch trigram probabilities of some of its components (stems-stems-stems or ending-ending-ending). The consideration of 6-tuple strings can be computationally expensive for real-time ASR decoding applications.

Another concern with the above approach is how the words can be split into stems and endings so as to sufficiently compress the size of the component vocabulary (as compared to the size of the vocabulary of non-split word forms). One method for splitting a vocabulary of word forms into stems and endings is to take a list of components (e.g., stems and endings) and then match each word form from the vocabulary with the list of components using a set of matching rules (such as described in the above-incorporated U.S. patent application Ser. No. 08/662,726). This approach, however, may not necessarily lead to the smallest total number of vocabulary components.

Another method for splitting word forms to produce a small word component vocabulary is the arithmetic-based method disclosed in U.S. Ser. No. 08/906,812 entitled "Apparatus and Method For Forming A Filtered Inflected Language Model For Automatic Speech Recognition" by Kanevsky et al., which is commonly assigned to the present assignee and incorporated herein by reference. With this arithmetic approach, word forms are mapped into word numbers which are then "split" into smaller numbers using modular arithmetic. The "split" numbers are used to represent corresponding vocabulary components. This method provides a significantly compressed representation of statistical data for distributions of n-tuples of words (i.e., n-grams). Although this approach provides efficient compression of the statistical data formed by the words comprising a large vocabulary, it does not provide for a method of reconstructing OOV words by verifying whether a word form generated by concatenating one or more "split" components is, e.g., a legal word. The reason for this is as follows. Word numbers from "split" component numbers are reconstructed using pure arithmetic means. If the "split components" (e.g., a pair of small numbers n1 and n2) are reconstructed into a word number N (e.g., the Nth word number in the vocabulary) which is smaller than or equal to the size of the vocabulary, a word can be matched to the reconstructed word number. In this manner, the Nth word in the vocabulary can be attached to the number pair n1 and n2. On the other hand, if the word number N is larger than the size of the vocabulary, N will not correspond to any word in the vocabulary and, consequently, no spelling can be attached to the reconstructed N (nor to the pair n1 and n2). Therefore, the above arithmetic compression method may not properly work with OOV words since there can be no match between OOV words and any word numbers.

A method for splitting acoustic baseforms into acoustic stems and endings is also disclosed in the above patent application U.S. Ser. No. 08/906,812. In this approach, acoustic stems and endings for baseforms of split words are associated with the stems and endings of the split words. Since words have multiple baseforms, this procedure generally produces larger multiple sets of acoustic stems and endings per each language stem and ending. For example, if a given word is associated with two different baseforms, then a corresponding stem and ending of the word can each be associated with two stem and ending baseforms. This gives rise to four new baseform units for the acoustic component vocabulary. This is demonstrated by the following example. Assume the word WALKED has two baseforms: W AO K D and W O K E D (in some phonetic representation with phonemes W, AO, K ,E, D). The stem WALK has two stem baseforms: W AO K and W O K; and the end ED has two baseform endings D and E D. From this example, it is apparent that although the number of language components is reduced, there can still exist a significant number of acoustic components. This raises the problem of efficient compression of the acoustic component vocabulary and the interfacing of acoustic and language component vocabularies which has not heretofore been addressed.

SUMMARY

The present application discloses systems and methods for modeling acoustic and language vocabularies. In one aspect of the invention, there is provided a method for generating a language component vocabulary VC for a speech recognition system having a language vocabulary V of a plurality of word forms. The method includes: partitioning the language vocabulary V into subsets of word forms based on frequencies of occurrence of the respective word forms; and in at least one of the subsets, splitting word forms having frequencies less than a threshold to thereby generate word form components.

In another aspect of the invention, a method for use in speech recognition includes: splitting an acoustic vocabulary comprising baseforms into baseform components and storing the baseform components; and, performing sound to spelling mapping on the baseform components so as to generate a baseform components to word parts table for use in subsequent decoding of speech. The acoustic vocabulary may be generated from a textual corpus by applying spelling to sound mapping to the textual corpus. The method may further include generating a language model vocabulary from the textual corpus, partitioning the language model vocabulary and splitting the partitioned language vocabulary into vocabulary components. The acoustic vocabulary and the partitioned language vocabulary may be split using the same splitting criteria.

In still another aspect of the invention, a method for decoding a speech utterance using language model components and acoustic components, includes the steps of: generating from the utterance a stack of baseform component paths; concatenating baseform components in a path to generate concatenated baseforms, when the concatenated baseform components correspond to a baseform found in an acoustic vocabulary; mapping the concatenated baseforms into words; computing language model (LM) scores associated with the words using a language model, and performing further decoding of the utterance based thereupon.

BRIEF DESCRIPTION OF THE DRAWINGS

For a better understanding of the present invention, reference is made to the following detailed description, taken in conjunction with the accompanying drawings in which like reference numerals designate similar or identical components, wherein.

DETAILED DESCRIPTION OF PREFERRED EMBODIMENT

It is to be understood that the present system and methods described herein may be implemented in various forms of hardware, software, firmware, or a combination thereof. Preferably, the present invention is implemented as a computer program which can be loaded into a general purpose computer workstation or PC, with the functional modules of the present system (described below) being implemented in software. In particular, the present invention is preferably implemented on a computer platform including hardware such as one or more central processing units (CPU), a random access memory (RAM), non-volatile hard-disk memory and various input/output (I/O ) interfaces. The computer platform also includes an operating system and may include microinstruction code. The various processes and functions described herein are preferably part of one or more application programs which are executed via the operating system. In addition, various peripheral devices may be connected to the computer platform such as a terminal, a data storage device and a printing device. It is to be further understood that, because some of the system elements described herein are preferably implemented as software modules, the actual connections shown in the FIGs. discussed below may differ depending upon the manner in which the present system is programmed. Of course, special purpose processors may be employed to implement the present system. Given the teachings herein, one of ordinary skill in the related art will be able to contemplate these and similar implementations of the elements of the present system.

Figure 1:
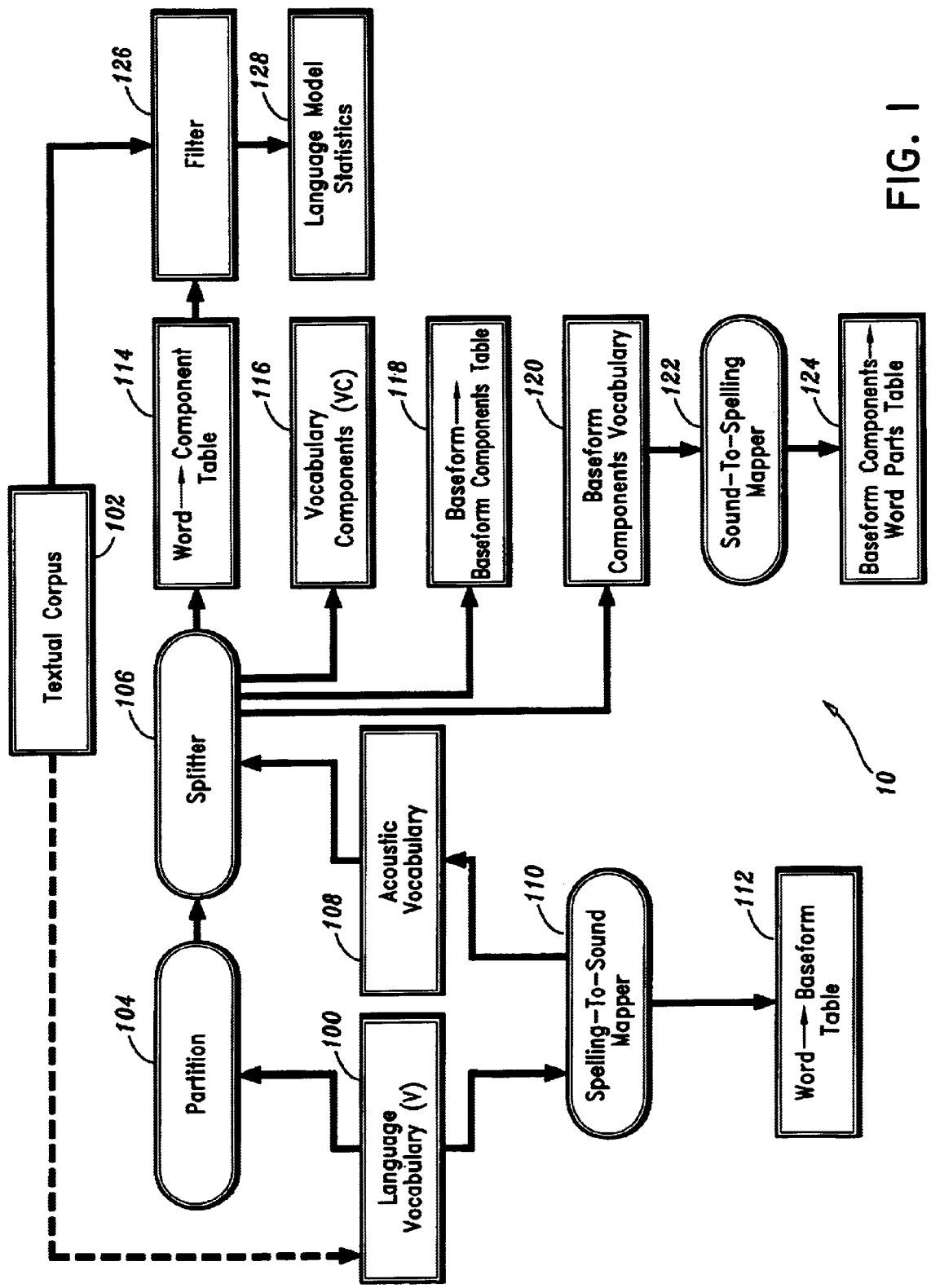
FIG. 1 is a block/flow diagram illustrating a system/method for generating a language vocabulary and an acoustic vocabulary in accordance with an embodiment of the present invention.

Referring to FIG. 1, a block diagram illustrates a system for producing language and acoustic vocabularies in accordance with an embodiment of the present invention. Particularly, FIG. 1 illustrates a system 10 for producing acoustic and language vocabulary components (during the pre-decoding stage in an ASR system) which are subsequently used by the ASR for decoding speech utterances. It is to be understood that the depiction of the system 10 in FIG. 1 can also be considered a flow diagram illustrating a method for producing language and acoustic vocabularies.

Component Vocabulary

The system 10 includes a language vocabulary module 100 which contains a given vocabulary V of different word forms. The language vocabulary module 100 numerates the vocabulary V in descending order (i.e., word forms are mapped into word numbers) in accordance with frequencies of the word forms, the frequencies being estimated from, e.g., a given textual corpus 102. A spelling-to-sound mapper module 110 maps the language vocabulary V in the language vocabulary module 100 into an acoustic vocabulary 108 consisting of baseforms (the process of which is described in further detail with reference to FIG. 7). It is to be understood that there can be several baseforms for one word. By way of example, the word "A" can have two different pronunciations and, therefore, two different baseforms. A word→baseform mapping table 112 stores the list of vocabulary words together with their corresponding baseforms which are generated via the spelling-to-sound mapper module 110.

A partition module 104 divides the vocabulary V in the language vocabulary module 100 preferably into three subsets of word forms S1, S2 and S3 in accordance with the scores associated with each of the words. By way of example, the word forms comprising vocabulary V may be partitioned as follows: S1 may include word forms having word numbers from 1 to 40,000, S2 may include word forms having word numbers from 40,001 to 400,000, and S3 may include the remaining word forms.

A splitter module 106, operatively connected to the partition module 104, splits each of the word forms contained in subsets S1, S2 and S3 in accordance with predetermined splitting rules. In a preferred embodiment, the following splitting rules apply: word forms in subset S1 are always treated as single units (i.e., the word forms are not split into components); word forms in subset S2 are split into 2-tuple components, e.g., stems and endings (a word form GOING can be split into a stem GO and an ending ING); and word forms in subset S3 are split into 3-tuple components (e.g., prefixes, stems and endings). It is to be understood that the term "n-tuple" used herein refers to an ordered set of n components.

It is to be further understood that each of the prefixes, stems and endings which result from splitting the word forms in subsets S2 and S3 in accordance with the splitting rules discussed above are treated as a single unit (i.e., a separate vocabulary component). All of the word form components generated by splitting the word forms in subsets S2 and S3, as well as the non-split word forms from subset S1, are combined and stored in a vocabulary components module 116 as a new language component vocabulary VC. Each of the vocabulary components stored in module 116 are labeled with different marks to distinguish between stems, prefixes and endings. These labels are subsequently used for concatenating the vocabulary components into full words. In addition, a word component table 114, connected to the splitter module 10, is used for storing the word forms in subsets S1, S2 and S3 together with their corresponding word component strings.

Component Language Model

A filter module 126, operatively connected to the word→component table a, 114, filters the textual corpus 102 to produce a corpus of components. The corpus of components generated by the filter module 126 are processed in a language model module 128 to generate an n-gram language model for the vocabulary components. Specifically, the filtering procedure utilizes the word→ component table 114 to map every word in the corpus 102 into a n-tuple set of components into which each word is split. For example, the following phrase "HE IS GOING" can be mapped into strings of components HE IS GO ING, assuming the word→component table 114 contains the following mapping::

HE - - - HE

IS - - - IS

GOING - - - GO ING

Next, strings of word components generated by the filter module 126 are accumulated in the language model module 128 wherein counts of n-tuple sets of word components (e.g., 1-tuple, 2-tuple, 3-tuple) are determined and utilized to estimate n-gram probabilities for a n-gram language model in accordance with the methods disclosed in the above incorporated application U.S. Ser. No 08/662,726 and "Statistical Methods For Speech Recognition", by F. Jelinek, The MIT Press, Cambridge, 1997, or by using any other conventional language models which utilize counts of n-tuples to generate statistical data.

It is to be understood that the number of different word components should be kept as small as possible in order to reduce the size of a n-gram language model. There are certain procedures that may be implemented (as described in detail below with reference to FIG. 6) for splitting the words into components so as to achieve a near-optimal size of a component vocabulary. The advantage of preserving most frequent words (in the first set S1) as whole units (for the case when a typical 3-gram language model is used) is as follows., A 3-gram language model of components provides probabilities of 3-tuples of consecutive components $s=(w\_1, w\_2, w\_3)$. If these components $w\_i$ represent whole words, they will be not concatenated and, therefore, their 3-gram probability scores can be obtained (e.g. $Prob(w\_3|w\_1, w\_2)$, which refers to the probability that $w\_3$ will follow $w\_2$ and $w\_1$. Since the set S1 represent the most frequent words, statistical information about frequent 3-tuples that consist of frequent words is preserved. Such information will be lost for words included in sets S2 and S3 since, after concatenation, 3-tuple of components result in 2-tuple or 1-tuple components. But since these sets consist of less frequent words, 3-tuples strings from these words would infrequently occur. Consequently, there is no essential loss of reliable statistical data.

Similar considerations are taken into account for sets S2 and S3. For example, 2-gram statistics of word forms from the language vocabulary V 100 are well represented when two subsequent components in the 3-tuples are made via splitting a word form belonging to S2 and a remaining component belongs to S1. In the case where every components of a 3-tuple string belongs to S2, such information on 2-gram statistics for full word forms is not preserved. But since S2 consists of relatively rare words, the probability for getting three subsequent components for words from S2 (or S3) is low and, therefore, information loss is minimized.

It is to be further understood that the preselected splitting rules for splitting the word forms into prefix, stem and/or ending can be based on factors such as spelling, phonemes, or morphemes. Indeed, by splitting the words in accordance with phonemes or morphemes, some restrictions may be placed on how words are split. For example, if some combination of letters gives rise to one sound (e.g., CH in REACHABLE), restrictions may be applied to prevent the group of letters "CH" from being split. This restriction may be required for building a consistent acoustic component vocabulary (as described in detail below).

Acoustic Component Vocabulary

Referring still to FIG. 1, the baseforms in the acoustic vocabulary A 108 are split into baseform components via the splitter module 106 (over the phonetic alphabet) and stored in the baseform component (or acoustic component vocabulary) module 120. It is to be understood that, unlike the language vocabulary V 100, the acoustic vocabulary A 108 is not partitioned into several sets based on their frequencies because the probability scores for n-tuples of baseform components are not computed. Various algorithms or methods may be implemented by the splitter module 106 for splitting baseforms of the acoustic vocabulary 108 to generate the baseform (or acoustic) component vocabulary 120. For example, baseforms can be split into base form components in the following manner: baseforms having average size lengths (e.g., between 5 to 9 phonemes) can be split into two components; baseforms having relatively longer lengths (e.g., more than 9 phonemes) can be divided into three components; and relatively short baseforms (e.g., less than 5 phonemes) can remain unsplit. By way of example, a baseform W AU K D can be treated as a single unit in the acoustic component vocabulary 120 despite the fact that the word WALKED (which corresponds to this baseform) can be split into two components: the stem "WALK" and the ending "ED". It is to be appreciated that baseforms are split into components in order to reduce the number of components in the acoustic component vocabulary 120 (assuming the splitting rules discussed above). On the other hand, it is not beneficial to split baseforms into very small components because the longer the baseforms are, the less confusable they are during decoding. For example, a long baseform REPREZENTEISN corresponding to the word REPRESENTATION is much less confusable than the very short baseform AE corresponding to the word A.

A baseform components→ word parts table T 124 is generated from the acoustic component vocabulary AC 108 via a sound-to-spelling mapper module 122. The method implemented in the sound-to-spelling mapper module 122 is discussed in further detail below with reference to FIG. 7. In the baseform components→ word parts table 124, every baseform component is associated with a list of word parts which can induce the corresponding baseform component. It is to be understood that these word parts do not necessarily coincide with components in VC 116 since, as explained above, the methods for splitting baseforms and words are different. For example, the table 124 may contain a word part WA for the word WALKED which is split into word components WALK and ED. The word part WA represents the baseform component WAU (which is obtained by splitting W AU K D). The table 124 is also used for reconstructing OOV words as explained further detail below with reference to FIG. 8.

Figure 2:
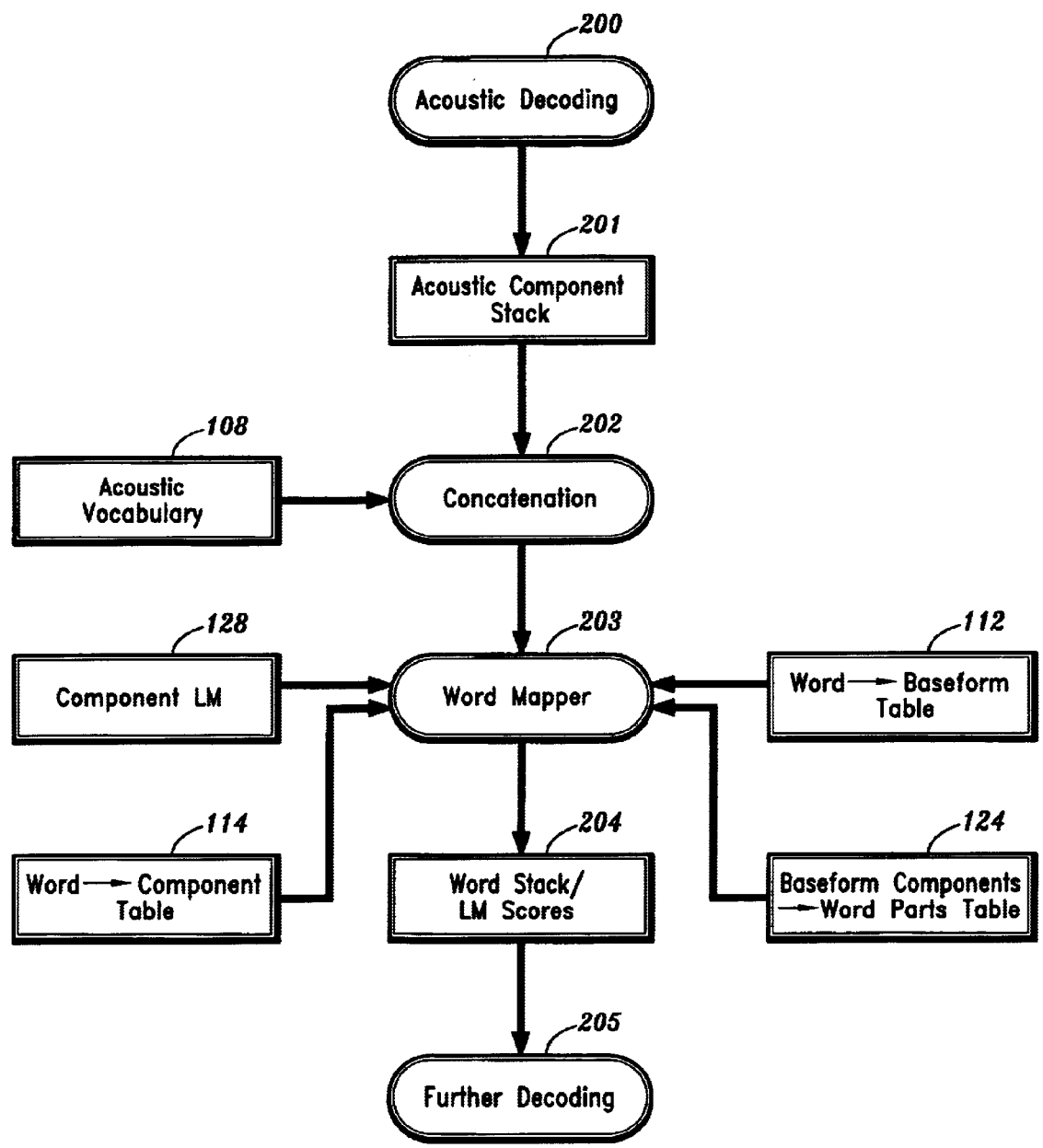
FIG. 2 is a block/flow diagram illustrating a decoding system/method using language and acoustic component models in accordance with the present invention.

Referring now to FIG. 2, a block/flow diagram illustrates a decoding process using language and acoustic components in accordance with the present invention. An acoustic decoding module 200 produces a set of baseform component strings which are used to produce an acoustic component stack 201. There are various methods which may be implemented for producing this set of components. For instance, a fast match process (as described in the above referenced application U.S. Ser. No. 08/662,726) may be implemented in a first stage which produces a short list of candidates of acoustically similar baseform components (represented as B(1)_1, B(1)_2, B(1)_, . . . ) which represent variants of pronunciation for given acoustic speech segments (represented as S(1)_1, S(1)_2, S(1)_3 . . . ). These acoustic speech segments represent approximately the same part of acoustic speech data with relatively small variations in segment endings. For example, a first baseform component B(1)_1=MAIL can represent an acoustic segment S(1)_1, and a second baseform component B(1)_2=M EI D can represent an acoustic segment S(1)_2 which overlaps with segment S(1)_1, but may have a slightly different length. Next, in a second stage, the baseform component B(1)_1 is followed by another set of fast match candidates (represented as B(12)_1, B(12)_2 , B(12)_3, . . . ) with acoustic segments (represented as S(12)_1, S(12)_2, S(12)_3, . . . ) that follow the corresponding acoustic segments S(1)_1. Similarly, the baseform component B(1)_2 is followed by a set of candidate baseform components, e.g., B(22)_1 B(22)_2 , B(22)_3, that represent the corresponding acoustic segments, e.g., S(22)_1, S(22)_2, S(22)_3 . . . , which follow the acoustic segment S(1)_2. This process is continued for several stages, which results in a stack of baseform component paths 201.

A concatenation module 202 processes the baseform component stack 201 in conjunction with the acoustic vocabulary 108 (FIG. 1). In particular, components in one path are concatenated (i.e., linked) into baseforms if the baseforms are found in the acoustic vocabulary 108. For example, assume B(1)_1=MAIL, B(12)_1=ED and B(12)_2=ING. Then in one path, B(1)_1 and B(12)_1 will be concatenated to form baseform MAILED if the baseform MAILED is included in the acoustic vocabulary 108. In another path, component baseforms B(1)_1 and B(12)_2 are concatenated into the baseform MAILING if the baseform mailing is included in the acoustic vocabulary 108. It is to be understood from the above example that a path containing several baseform components can have several different variants of concatenated baseform components which gives rise to several new paths of baseforms associated with the single path of baseform components.

There are several procedures that are performed in the concatenation module 202 on concatenated baseforms. The first procedure produces words that already exist in the vocabulary 100 (FIG. 1), as well as LM scores for n-tuples of such words. In this procedure, baseforms are initially mapped into words via a word mapper module 203 using the word→baseform table 112 (FIG. 1). These words are then mapped into a string of sub-words using the word→component table 114 (FIG. 1). Next, using the language model module 128 (FIG. 1), LM scores are computed for strings of sib-words (as explained in further detail with reference to FIG. 5). These LM scores are attached to the word strings that produced the corresponding strings of sub-words. The resulting stack of words and their corresponding LM scores 204 are sent to decoding module 205 for further decoding.

In a second procedure, an attempt is made to reconstruct OOV words. The first procedure described above only allows reconstruction of word forms that are stored in the language vocabulary 100 and represented in the word→ baseforms table 112. For instance, if a given string of acoustic components (e.g., a 2-tuple c1, c2, or a 3-tuple c1, c2, c3) from the acoustic component stack 201 cannot be concatenated in module 202 (i.e. there is no such baseform in the acoustic vocabulary 108), then this string of components is sent to the word mapper module 203, where the components are mapped into word parts via the baseform components→word parts table 124 (e.g., to a 2-tuple W1, W2 or 3-tuple W1, W2, W3). Then, a LM score is computed for these tuples of words using the language model module 128. If the LM score for the n-tuple of word parts (n=2 or 3) exceeds a predetermined threshold, then a concatenated word form (W1W2 or W1W2W3) is determined to be a legal word, and is then added to the word stack module 204 with the corresponding LM score for a further decoding 205.

The further decoding process 205 can involve different procedures. For example, if the acoustic decoding module 200 produces a fast match list of components 201, then decoding module 205 can send the word stack 204 to a detailed match processor to estimate the best sequence of words (adding LM scores to acoustic scores).

On the other hand, the acoustic decoding module 200 can produce an N-best list with word units that consist of components using a technique similar to the standard method for producing N-best lists disclosed in the above-mentioned reference "Statistical-Methods For Speech Recognition", by F. Jelinek. An N-best list is a set of N sentences that have highest scores. Decoding usually produces many candidate sentences (e.g., several thousand). Each of these sentences has some likelihood score that measures how these candidate sentences match acoustic data. The N sentences (e.g. for N=100) having the highest likelihood score provide the N-best list. If the decoding module 200 produces N-best lists, then the word stack module 204 will contain an N-best list based on words that were concatenated from word parts via the word mapper module 203. In this case, the further decoding 205 coincides with conventional procedures for processing N-best lists.

It is to be appreciated that a LM for linguistic components described above may be a LM that "splits" word numbers into smaller numbers ("components") via the modular arithmetic method described in the above-incorporated application U.S. Ser. No. 08/906,812. Indeed, the linguistic LM of components is complementary to the arithmetic LM of components for the following reasons. On one hand, the linguistic LM allows OOV words to be reconstructed, and estimates probability scores of n-tuples of words with low counts via a smoothing technique (as explained in further detail with reference to FIG. 4). On the other hand, the arithmetic-based LM of components allows more statistical data to be stored on n-tuple of words (for which counts are known) since it is very compact. In particular, a 4-gram LM can be utilized for arithmetic components when it is not practical to utilize higher than a 3-gram LM for linguistic components in existing versions of real time ASR. Because of the complementary properties of these two types of language models, a mixture of these language models can be used in a single decoder. If arithmetic components give rise to an n-tuple of word numbers corresponding to an n-tuple of words with high counts, then a probability score from the arithmetic-based LM can be used. Otherwise, data from linguistic-based LM for components can be used.

Figure 3:
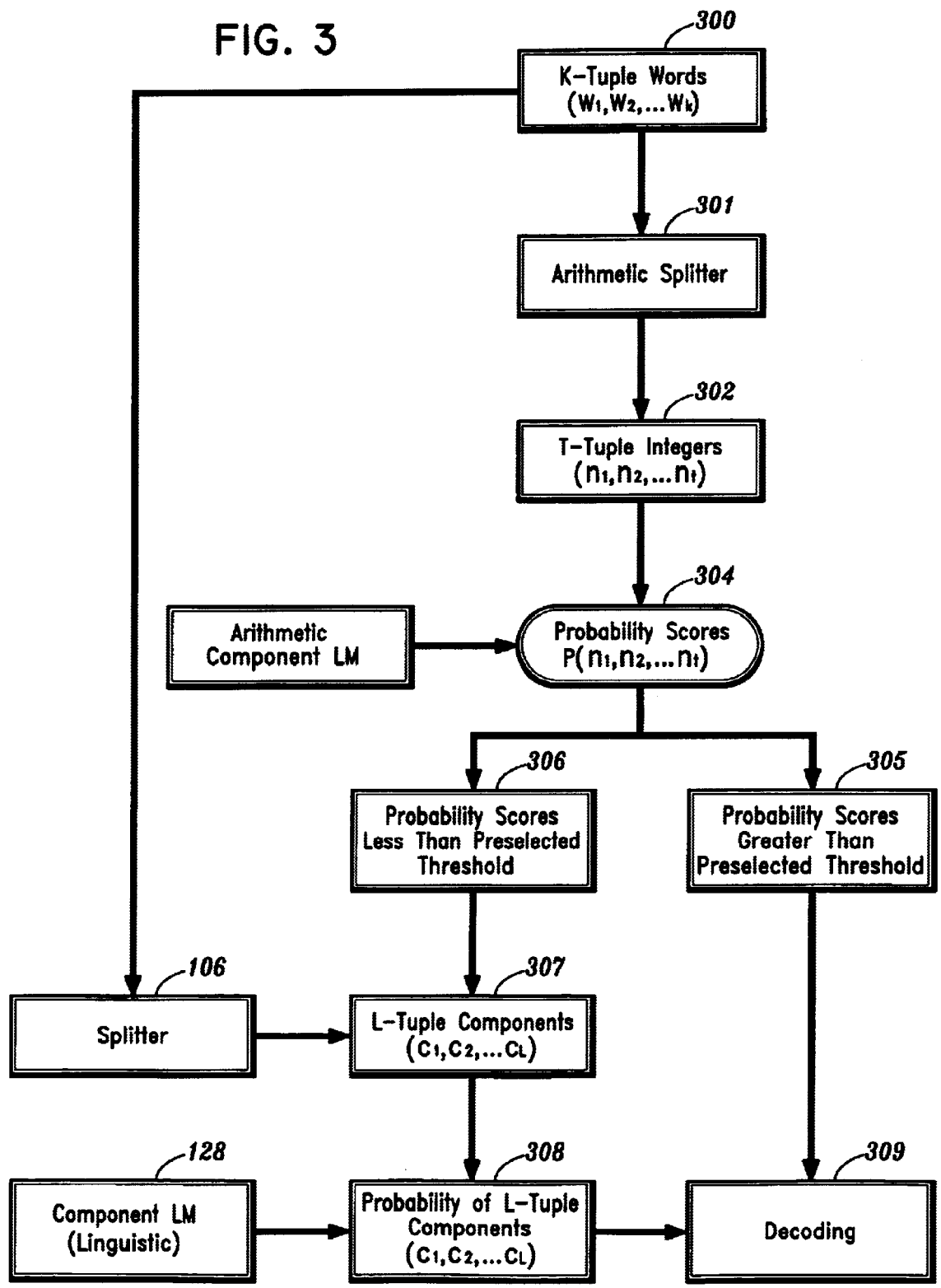
FIG. 3 is a block/flow diagram illustrating a system/method for combining different language models of components (e.g., arithmetic and linguistics) in a single decoding system in accordance with the present invention.

Referring now to FIG. 3, a block/flow diagram illustrates a method for incorporating several types of component language models (e.g., mixing arithmetic and linguistic LMs of components as mentioned above) into one decoding system. A k-tuple of word forms 300 is mapped into a t-tuple of integers 302 using an arithmetic splitter module 301 in accordance with the method described in the above-incorporated application U.S. Ser. No. 08/906,812. In particular, the arithmetic splitter module 301 maps the k-tuple word forms 300 into word numbers. The word numbers are then split into smaller numbers. A typical example of splitting a word number into a smaller number involves taking a residue and integer quotient of the word number by some other small (fixed) number (e.g., assuming the fixed number is 10, the number 125 has residue equal to 5 and an integer quotient that equals 12, which results in a mapping of 125 in (5,12)).

The resulting t-tuple of integers 302 gives rise to a probability score in module 304 (as described in the above-incorporated application U.S. Ser. No. 08/906,812). If a probability score in module 304 is determined to exceed a preselected threshold number Σ (which means that there was a high count for the t-tuple of integers), then the probability scores which exceed the preselected threshold 305 are sent to a decoder 309 as a probability value for the k-tuple of words 300. On the other hand, if the probability scores 304 are determined to be smaller than the preselected threshold Σ 306, then the k-tuple of words 300 is split (via module 106 of FIG. 1) into L-tuple linguistic components 307.

As discussed above, the linguistic split can be based on spelling (e.g. GO-ING), phones (e.g., not splitting CH into C-H in a word REACHABLE since CH gives rise to one sound) or morphemes (e.g. parts of words TION that are pronounced similarly SHION). The L-tuple components 307 give rise to a probability score 308 which is computed via module 128 (as explained above with reference to FIG. 2). These scores 308 are then sent to the decoder 309 where the LM scores for words (Block 402 in FIG. 2) are computed (also as explained above with reference to FIG. 2).

Figure 4:
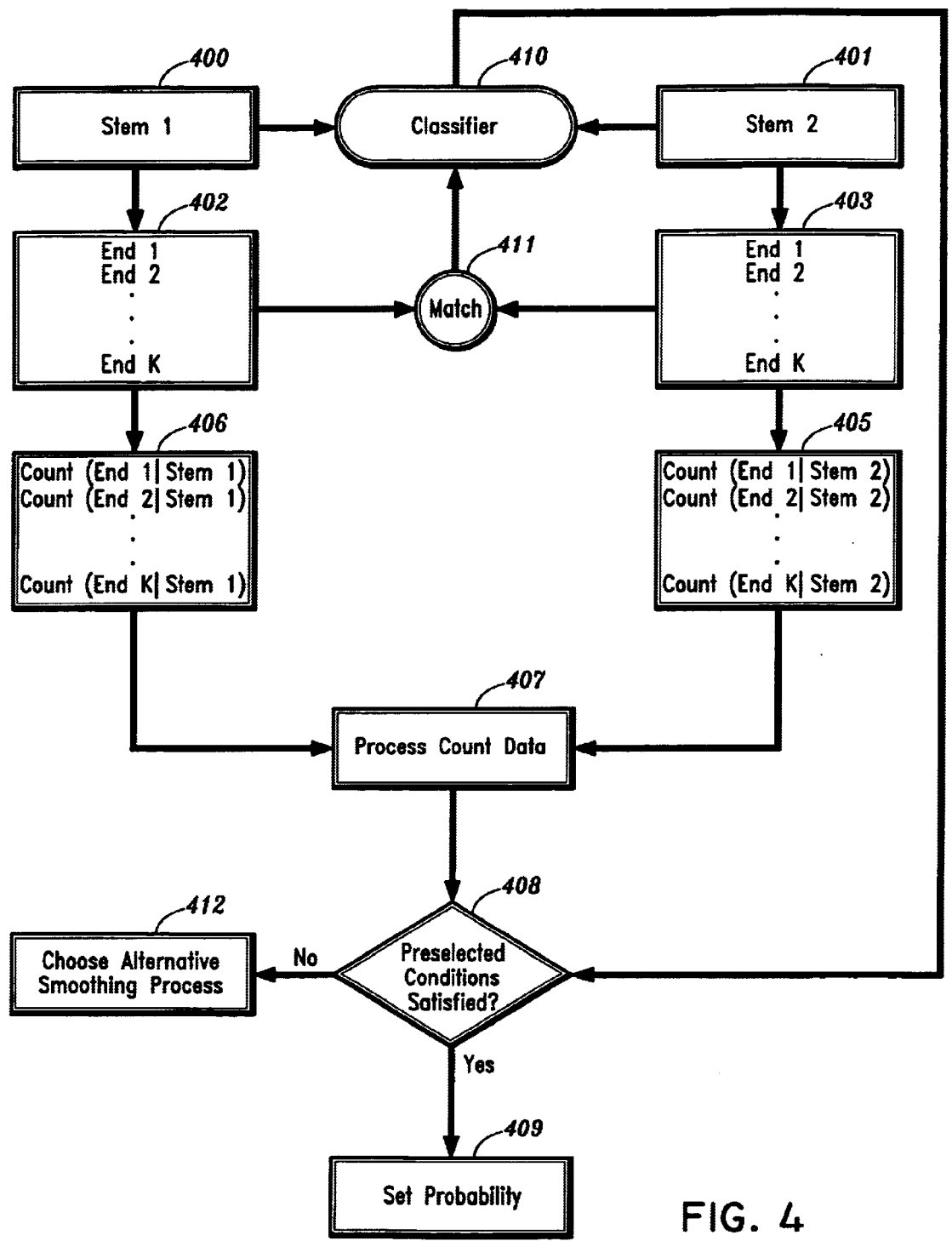
FIG. 4 is a flow diagram illustrating a smoothing process for linguistic, components in accordance with one aspect of the present invention.

Referring now to FIG. 4, a block/flow diagram illustrates a smoothing process for linguistic components. This process is considered when two stems, stem1 400 and stem2 401, have the same set of possible endings 402 and 403, respectively. In particular, a match block 411 verifies whether stem1 400 and stem2 401 have the same set of possible endings by comparing the list of ends 402 for stem 1 with the list of ends 403 for the second stem 401. For example, the Russian stems STUL (chair) and STOL (table) have the same set of possible endings such as "A with STOL-A ("near a table"); "U" with STOL-U ("to a table"); and "OM" for STOL-OM ("by a table"). For stem1 400, a first count block 406 counts the number of times each of the endings in 402 follows the stem 400. Likewise, a second count block 405 counts the number of times each of the endings 403 follows stem2 401. These counts are processed in accordance with a preselected set of conditions (block 407). For instance, one condition may be that one stem (in our example, stem1)

must have high counts for all possible endings that follow the stem and another stem (in our example, stem2) must have low counts for some it endings that follow the stem. In this example, if these preselected conditions are satisfied (affirmative result in block 408), then the probabilities for endings following the stem2 are set as probabilities for these endings to follow stem1 (block 409). If not, the above smoothing process is not utilized (negative result in block 408) and alternative conventional smoothing methods for low count words that do not exploit these linguistic structures can be used (block 412), such as the methods described in the book by F. Jelinek, entitled "Statistical Methods For Speech Recognition", The MIT Press, Cambridge, 1997.

It is to be understood that more complex formulas for smoothing low counts are possible. For example, one can estimate how counts for a given ending which follows a given stem (e.g., stem)1 can be represented as a weighted sum of counts for other endings that follows this stem. This weighted formula could be used to estimated probabilities in for this ending with stem2 (through the same weighted sum of counts of endings that follow the stem2 which have high counts). Furthermore, additional conditions that may be considered (in block 408) such as a requirement that both stem 1 400 and stem2 401 belong to a certain class or classes (which is determined via a classifier block 410). For example, a Russian word DOM ("a house") has the same set of endings as the Russian stems STOL and STUL. But if a class "furniture" is used as a condition to distinguish stems in the classifier 410, for example, then count data will not be applied to the preselected conditions (block 407) for the stem DOM to estimate its ending counts for endings that follow stems belonging a furniture class. Various classification methods that can be used in the classifier 410 are disclosed in the above reference "Statistical Methods For Speech Recognition" by F. Jelinek.

Figure 5:
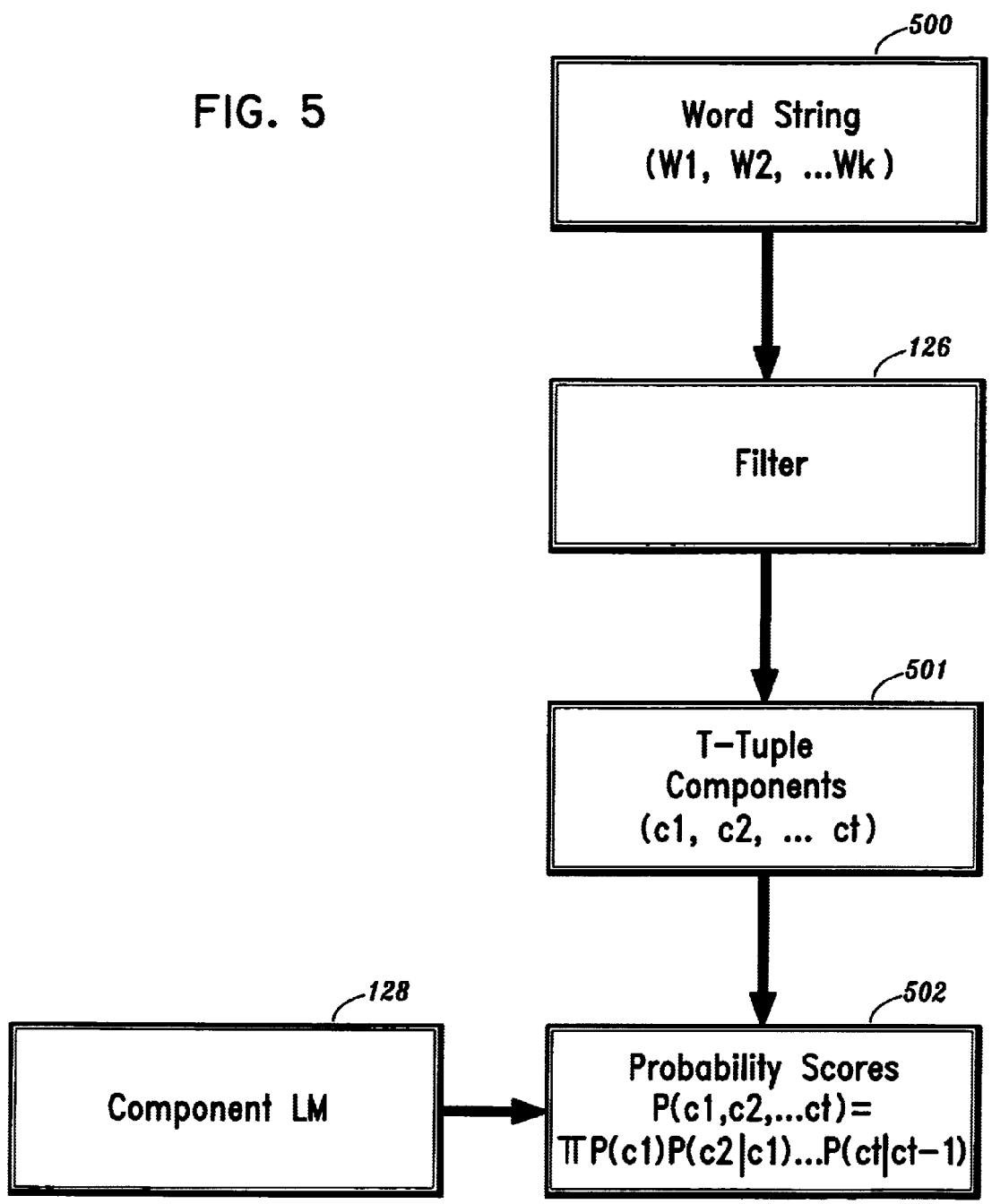
FIG. 5 is a block/flow diagram illustrating a method for deriving language model probability scores for words from probability scores of corresponding tuples of components in accordance with one aspect of the present invention.

Referring now to FIG. 5, a block/flow diagram illustrates a process for deriving language model probability scores for words from probability scores of corresponding tuples of components. A string of words 500 is mapped into a string of t-tuple components 501 via the filter 126 (FIG. 1). A probability for the t-tuple 501 is computed using the Component LMs 128. This probability score is deemed to be the probability score for the k-tuple of words 500. One example of computation of the probability score for the T-tuple of components is shown in Block 502. This probability is computed recursively as the product of probability scores that a component in the T-tuple 501 follows the preceding component in this tuple.

Figure 6:
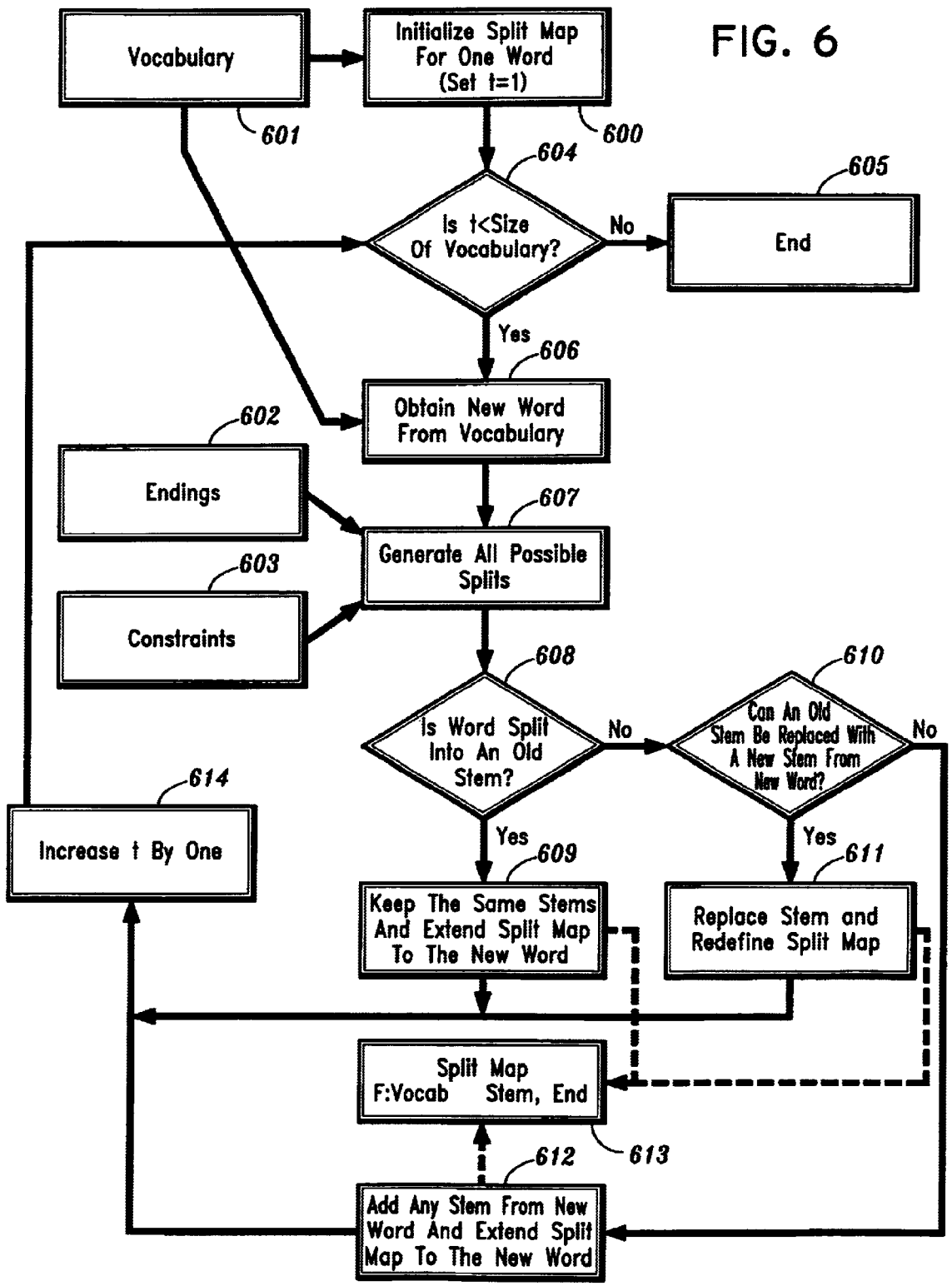
FIG. 6 is a flow diagram illustrating a method for splitting words from a given vocabulary into stems and endings in accordance with one aspect of the present invention.

Referring now to FIG. 6, a flow diagram illustrates a method for splitting words from a given vocabulary V into stems and endings to provide an optimal (or substantially optimal) vocabulary compression. The method can be utilized in applications that require compression of a large vocabulary. The method of FIG. 6 assumes that the following is provided: a sorted, fixed vocabulary 601 ($\hat{W}=\{w_1,\ldots,w_n\}$); a fixed list of allowed endings 602 ($\hat{E}=\{e_0, e_1, \ldots, e_1,\}$, where $e_o$ denotes an "empty" ending). It is further assumed that a fixed set C of constraints 603 for splitting words into stems is provided. For example, one constraint may be preventing a word that contains a given string of letters from being split within the string if the string of letters gives rise to one phoneme. Additional linguistic constraints can be employed in the constraints block 603.

Now given the fixed list of endings 602 and the set of constraints C 603, a word can typically be split into stems and endings in several ways subject to constraints C 603. In the following splitting method, each word from the fixed vocabulary 601 is split into a stem and ending (i.e., w=se) such that the resulting ending is an element of the fixed set of endings (i.e., e ∈ E) so as to substantially minimize the total number of all stems that are required to split every word in the given vocabulary V 601.

Initially, a "split map" 613 is initialized by setting a parameter t=1, selecting a first word from the fixed vocabulary 601, and the word is randomly split into a stem and ending. A stem set consisting of the stem and a word set consisting of the word is then defined (step 600). Next, a determination is made as to whether t is less than the size of the fixed vocabulary 601 (step 604). If not, the process is terminated (step 605). On the other hand, if t is less than the size of the vocabulary 601, a new word is obtained from vocabulary 601 (step 606 ). Next, all possible splits for the new (current) word into stems and endings is determined using the set of allowable endings 602 and any constraints 603 (step 607). After all allowable splits for the current word are built, a determination is made as to whether there is a split that produces a stem that was previously stored in the stem set (in step 600 from previous iterations) (step 608). If so, the current word may be split into the previously stored stem and ending. (i.e., the split map 613 can be extended to the new word) (step 609). On the other hand, if the current word cannot be split into previously stored stems and endings (negative result in step 608), then a determination is made as to whether a previously stored stem (in the stem set) can be replaced with a new stem that was used to split the current word (step 610). In particular, the new stem replaces previously stored stems and it is determined whether other words (which are stored in the word set during previous iterations) will remain split after such substitution. If, after some stem substitution, all stored words remain split (affirmative determination in step 610), then the stem substitution is fixed (in the stem set of stored stems) and the split map 613 is redefined for the new stem (step 611). On the other hand, if previously stored stems cannot be substituted with the new stem from the current word (negative result in step 610), then any new stem (into which the current word may be split) is added into the stem set of stored stems, and the split map 613 is extended to the current word by splitting the new word into the new stem (step 612). Afterwards, the parameter t is increased by 1 (step 614) and the process is continued until no new words can be obtained from the fixed vocabulary into the word set (i.e., t=the size of the vocabulary 601).

Figure 7:
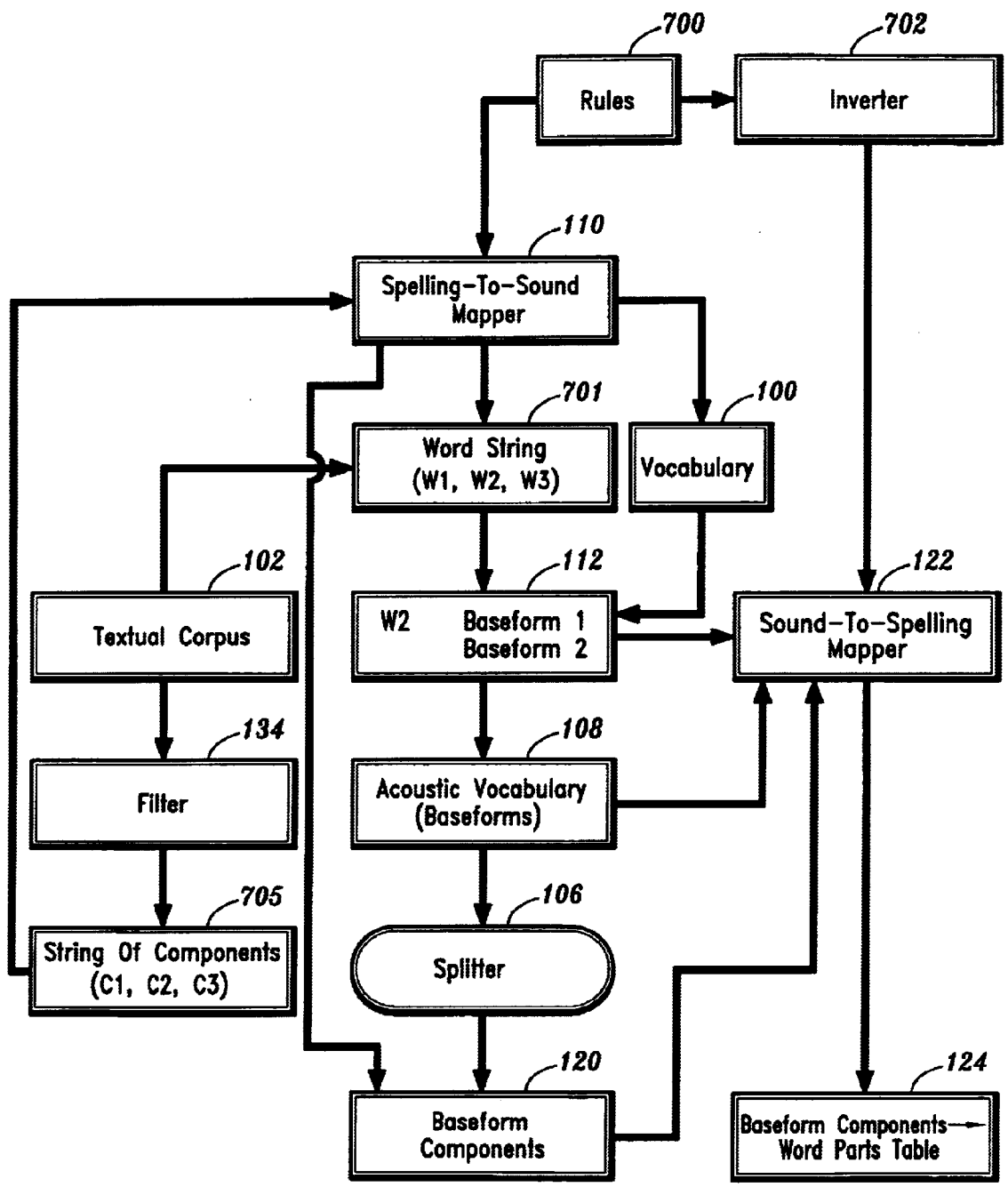
FIG. 7 is a block/flow diagram illustrating spelling-to-sound and sound-to-spelling mapping process in accordance with one aspect of the present invention.

Referring now to FIG. 7, a block/flow diagram illustrates the spelling-to-sound process and the sound-to-spelling process of the present system. The spelling-to-sound mapper module 110 operates pursuant to a predetermined set of rules 700. For ASR of the Russian language, for example, one rule that can be applied is if o is stressed, then it is pronounced as O, otherwise it is pronounced as A. Another rule that can be applied is the letter "eh" can be pronounced as A if some context conditions are fulfilled. The Russian language has standard rules for pronunciations that can be implemented in the manner described in the article "Large Vocabulary Speaker-Independent Continuous Speech In Russian Language" by D. Kanevsky et al., in proceedings of SPECOM'96, pp. 117–121, St. Petersburg, Russia, 28–31 Oct., 1996.

The rules 700 are applied to each word in a word string 701 (e.g. applied to word2 with its left and right contexts, word1 and word3) via the spelling-to-sound mapper module 110. These word strings can be obtained from the textual corpus 102. It is to be noted that since the rules 700 can depend on context, the contexts of each word must be known. For example, pronunciation of some Russian words depends on part of speeches to which these words belong. These parts of speech, in turn, can sometimes be uniquely defined only if a context is known. Pronunciations of words (baseforms) are obtained from the word→ baseforms table 112 (e.g., as shown in FIG. 7, W2 from the word string 701 has two baseforms 1 and 2 associated therewith). It is understood that there can be multiple baseforms per word, for example, if pronunciation of words depend on context.

Next, some words that are included in the vocabulary 100 can be missed in the textual corpus 102. Therefore, the rules 700 used in the spelling-to-sound mapper module 110 are applied to the LM vocabulary 100 as well, in order to produce new word/baseform pairs which are stored in the word→baseforms table 112.

All baseforms that are stored in 112 are collected in the acoustic vocabulary 108. The splitter module 106 produces acoustic baseform components that are stored in baseform components store 120. Other baseform components are obtained by applying the spelling-to-sound module 110 to strings of components 705. These baseform components are used to make some of the entries in the Baseform Components→Word Parts Table 124 by applying a sound-to-spelling mapper 122 (to the baseform components). Other entries in Table 124 are obtained by applying spelling-to-sound mapper 110 to the string of components 705 and then applying sound-to-spelling mapper 122 to produce a string of baseform components. This is done because, as with the word string 701, pronunciations of components 705 depends on contexts of other components. The components are obtained by applying the textual corpus 102 to the filter 134.

The sound-to-spelling mapper module 122 operates by inverting the predetermined set of rules 700 via an inverter module 702. By way of the above example for the rules 700, an exemplary inverted rule is: the sound O is mapped to the letter o if the sound was stressed, otherwise, the sound O is mapped into the letter A. The condition for mapping A is obtained by reversing the condition described above, i.e., by applying the context to eh. The sound-to-spelling module 122 produces the baseform components→ word parts table 124 by utilizing the data from the word baseforms table 112, the acoustic vocabulary 108, and the baseform component store 120.

Although the illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for splitting words in a language vocabulary V in an automatic speech recognition system to provide vocabulary compression, wherein the vocabulary V has a fixed size, the method comprising the steps of:

(a) providing a fixed set of allowable endings, including an empty ending;

(b) providing a fixed set of constraints for splitting words into stems;

(c) initializing a split map of words and the corresponding stems and endings by setting a variable t to a predetermined value, and selecting a first word from the fixed vocabulary;

(d) randomly splitting the first word to generate an ending from the fixed list of allowable endings and a stem;

(e) defining and storing a stem set containing the stem generated at said splitting step (d) and a word set containing the first word;

(f) determining whether t is less than the size of the vocabulary V;

(g) obtaining a new word from the vocabulary V, when t is less than the size of the vocabulary V;

(h) determining possible splits for the new word to generate stems and endings therefrom, using the fixed set of allowable endings and the fixed set of constraints;

(i) determining whether there is a split for the new word that generates a previously stored stem of the stem set;

(j) splitting the current word into the previously stored stem and an ending of the set of allowable endings, when there is a split for the new word that generates the previously stored stem of the stem set;

(k) determining whether another previously stored stem in the stem set can be replaced by a new stem generated at step (h), when there is no split for the current word that generates the previously stored stem of the stem set;

(l) redefining the stem set and the split map to include the new stem generated at step (h) in place of the other previously stored stem, when the other previously stored stem can be replaced by the new stem, when the other previously stored stem can be replaced by the new stem generated at step (h);

(m) redefining the stem set to include any new stem into which the current word may be split and extending the split map to include the current word by splitting the new word into the new stem, when the other previously stored stem in the stem set cannot be replaced by the new stem generated at step (h); and (n) incrementing t and returning to step (f) if t is less than the size of the vocabulary V.

2. The method of claim 1, further comprising the step of terminating the method if t is not less than the size of the fixed vocabulary.

3. The method of claim 1, wherein said determining step (k) comprises the step of determining whether other words stored in the word set during previous iterations will remain split after such substitution.

4. The method of claim 1, wherein the vocabulary is sorted such that the words in the language vocabulary V are numerated in descending order based on frequencies associated with each of the words.

5. The method of claim 1, wherein step (j) further comprises the step of extending the split map to the new word.

6. The method of claim 1, wherein step (i) generates all possible splits for the new word.

7. A program storage device readable by machine, tangibly embodying a program of instructions executable by the machine to perform method steps for splitting words in a language vocabulary V in an automatic speech recognition system to provide vocabulary compression, wherein the vocabulary V has a fixed size, the method comprising the steps of:

(a) providing a fixed set of allowable endings, including an empty ending;

(b) providing a fixed set of constraints for splitting words into stems;

(c) initializing a split map of words and the corresponding stems and endings by setting a variable t to a predetermined value, and selecting a first word from the fixed vocabulary;

(d) randomly splitting the first word to generate an ending from the fixed list of allowable endings and a stem;

(e) defining and storing a stem set containing the stem generated at said splitting step (d) and a word set containing the first word;

(f) determining whether t is less than the size of the vocabulary V;

(g) obtaining a new word from the vocabulary V, when t is less than the size of the vocabulary V;

(h) determining possible splits for the new word to generate stems and endings therefrom, using the fixed set of allowable endings and the fixed set of constraints;

(i) determining whether there is a split for the new word that generates a previously stored stem of the stem set;

(j) splitting the current word into the previously stored stem and an ending of the set of allowable endings, when there is a split for the new word that generates the previously stored stem of the stem set;

(k) determining whether another previously stored stem in the stem set can be replaced by a new stem generated at step (h), when there is no split for the current word that generates the previously stored stem of the stem set;

(l) redefining the stem set and the split map to include the new stem generated at step (h) in place of the other previously stored stem, when the other previously stored stem can be replaced by the new stem, when the other previously stored stem can be replaced by the new stem generated at step (h);

(m) redefining the stem set to include any new stem into which the current word may be split and extending the split map to include the current word by splitting the new word into the new stem, when the other previously stored stem in the stem set cannot be replaced by the new stem generated at step (h); and (n) incrementing t and returning to step (f) if t is less than the size of the vocabulary V.

* * * * *